UNITED STATES PATENT OFFICE 2,118,501

IGNITION COMPOSITIONS

William F. Filbert and Walter E. Lawson, Woodbury, N. J., assignors to E. I. du Pont de Nemours & Company, Wilmington, Del., a corporation of Delaware No Drawing. Application July 8, 1937, Serial No. 153,870

11 Claims. (Cl. 52—4)

The present invention relates to processes for the preparation of new compositions of matter, and more particularly to new compositions of matter derived from the nitration products of diphenylol propane. The invention also relates to new explosive compounds, and in particular to new ignition compositions for use in electric blasting initiators.

It is known that electric blasting initiators ordinarily consist of cylindrical shells or capsules containing a base charge of explosive material, and ignition compositions superimposed thereon, and means for electrically firing said ignition composition.

The object of the present invention is the preparation of new compositions of matter. Another object is a new composition of matter derived from the nitration products of diphenylol propane. A further object is a new explosive composition. A still further object is an ignition composition suitable for use in electric blasting initiators. Further objects will be apparent from the detailed description of our invention which follows.

We have found that the foregoing objects may be accomplished by the nitration of diphenylol propane, and the preparation of the lead salts, and especially the basic lead salts formed from the products of said nitration.

In particular, we have determined that diphenylol propane may be nitrated by the process which comprises dissolving it in glacial acetic acid and reacting the resulting solution with nitric acid. The nitration product separates in the form of a brick red precipitate. Upon purification, this yields a solid which is believed to be tetranitrodiphenylol propane. Our preferred method of preparation is illustrated in detail in Example I.

Example I 100 grams of pure diphenylol propane (melting point 155° C.) was dissolved in 700 cc. of glacial acetic acid and cooled to 15° C. Two hundred cc. of 70% nitric acid (large excess) was added slowly with stirring, keeping the temperature between 15° and 20° C. A yellow precipitate, presumably of the dinitro compound, formed after approximately 30 cc. of acid had been added. The mixture was allowed to warm up slowly and the temperature was gradually raised to 38° C., where reaction started again. The temperature rise was checked by surrounding the nitration beaker with ice. Most of the precipitated material dissolved with the evolution of oxides of nitrogen. When the temperature reached 41° C. a yellow precipitate formed rapidly and the reaction subsided. The reaction mixture was carefully warmed to 50° C. and maintained at that point for ten minutes. It was then cooled to 25° C. and filtered. The product was washed with 50% acetic acid and water. It was then recrystallized from diluted acetone. The purified product melted at from 233 to 234° C. This product was tetranitrodiphenylol propane.

Three lead salts were prepared from the nitration product of the diphenylol propane. The compositions of these lead salts corresponded respectively to the normal lead salt, the monobasic lead salt and the bis-basic lead salt of tetranitrodiphenylol propane. These salts were prepared by the reactions between solutions of lead nitrate and solutions of the nitrated diphenylol propane in alkali.

The following examples serve to illustrate in detail the preferred methods for preparing these lead salts.

Example II

The normal lead salt was prepared as follows. A solution of 8.16 grams of tetranitrodiphenylol propane and 19.1 cc. of 2.096 normal sodium hydroxide in 200 cc. of water was added very slowly to a well-stirred solution of 6.62 grams of lead nitrate in 400 cc. of water which was maintained at 90° C. A dark red crystalline precipitate, which was a mixture of flat plates and prisms was formed. The solution was cooled and filtered, and the precipitate thoroughly washed with both hot and cool water, and finally with methanol. The dried precipitate was orange red in color, and had a lead content of 32.9% which corresponds substantially to the theoretical lead content, 32.8%, of normal lead salt of tetranitrodiphenylol propane calculated as

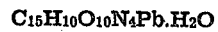

$C_{15}H_{10}O_{10}N_4Pb.H_2O$

Example III

The mono-basic lead salt was prepared by slowly adding a solution of 4.08 grams of tetranitrodiphenylol propane in 19.1 cc. 2.096 normal sodium hydroxide, which was diluted with water to 125 cc., to a well-stirred solution of 6.62 grams of lead nitrate in 300 cc. of water, the temperature being maintained at 90° C. After this addition, the mixture was agitated at 90° C. for an additional 45 minutes. The precipitate settled out as fine, flat yellow crystals of irregular shape. It was washed thoroughly with both hot and cold water, and then with hot methanol. The dried precipitate constituted 98% of the theoretical yield. Analysis showed a lead content of 48.9% as compared with the theoretical lead content 48.5 of the mono-basic lead salt of tetranitrodiphenylol propane having the formula $C_{15}H_{12}O_{12}N_4Pb_2$.

*Example IV*

The bis-basic lead salt of tetranitrodiphenylol propane was prepared in the following manner. A solution of 4.08 grams of tetranitrodiphenylol propane and 2.4 grams of sodium hydroxide in 200 cc. of water was added slowly to a well-stirred solution of 21 grams of lead nitrate in 200 cc. of water, the temperature being maintained between 80 and 90° C. A bright yellow precipitate consisting of fine, irregularly shaped flat plates was formed. The hot suspension was filtered and the precipitate was washed with water, methanol, and acetone. Analysis showed a lead content of 54.1%, as compared with the theoretical lead content 55.8%, of bis-basic lead salt of tetranitrodiphenylol propane having the formula $C_{15}H_{16}O_{15}N_4Pb_3$.

These salts have been found useful as ignition agents. They are not sensitive to the point where hazard is involved in their application, but rather are mild in their ignition. When combined with an oxidizing agent, as potassium chlorate for example, they yield a mixture that burns quietly and at a uniform rate. Such a mixture is well adapted for use as a loose ignition charge in an electric blasting initiator of the regular bridge plug type, i. e. one wherein the bridge wire extends down into the loose ignition composition, which generally is superimposed on an explosive charge of greater potential energy.

Likewise, these lead salts of tetranitrodiphenylol propane are very satisfactory when used in the concave plug type blasting initiator. A typical composition is as follows:

| | Per cent |
|---|---|
| Lead salt | 85 |
| Zirconium | 10 |
| Nitrostarch | 5 |
| | 100 |

These ingredients are desirably gelatinized with a suitable solvent and introduced into the plug according to common procedure. This composition dries satisfactorily and when fired, exhibits excellent flash and flame characteristics. The volume of the gases developed in the firing of such composition is relatively low. Consequently, it may be employed advantageously in those initiators of the closed type wherein it is important that premature bursting of the initiator shell be prevented.

Furthermore, these lead salts may be desirably employed for blasting initiators of the bead and match head types wherein the ignition composition is ordinarily applied by dipping the fuse head of the initiator into a suspension containing said ignition composition.

The examples above are given merely by way of illustration and are not intended to limit our invention. Furthermore, many variations in compositions and methods of preparation may be made without departing from the scope of our invention. For example, in the preparation of the lead salts described, any soluble lead salt may be employed in place of lead nitrate. We intend, therefore, to be bound only by the following claims.

We claim:

1. As a new composition of matter, a lead salt of the nitrated product of diphenylol propane.
2. As a new composition of matter, a lead salt of tetranitrodiphenylol propane.
3. As a new composition of matter, a basic lead salt of tetranitrodiphenylol propane.
4. As a new composition of matter, a mono-basic lead salt of tetranitrodiphenylol propane.
5. As a new composition of matter, a bis-basic lead salt of tetranitrodiphenylol propane.
6. An ignition composition comprising a lead salt of the nitrated product of diphenylol propane.
7. An ignition composition comprising a lead salt of tetranitrodiphenylol propane.
8. An ignition composition comprising a basic lead salt of tetranitrodiphenylol propane.
9. An ignition composition comprising a lead salt of tetranitrodiphenylol propane and an oxidizing agent.
10. An ignition composition comprising a basic lead salt of tetranitrodiphenylol propane and an oxidizing agent.
11. An ignition composition in an electric blasting initiator, which composition comprises a lead salt of tetranitrodiphenylol propane, zirconium and nitrostarch.

WILLIAM F. FILBERT.
WALTER E. LAWSON.